United States Patent
Roth

(10) Patent No.: US 12,466,652 B2
(45) Date of Patent: Nov. 11, 2025

(54) RFID TOTE SYSTEMS AND METHODS

(71) Applicant: Avery Dennison Retail Information Services LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 831 days.

(21) Appl. No.: 17/778,156

(22) PCT Filed: Nov. 25, 2020

(86) PCT No.: PCT/US2020/062388
§ 371 (c)(1),
(2) Date: May 19, 2022

(87) PCT Pub. No.: WO2021/108681
PCT Pub. Date: Jun. 3, 2021

(65) Prior Publication Data
US 2023/0020367 A1    Jan. 19, 2023

Related U.S. Application Data

(60) Provisional application No. 62/939,905, filed on Nov. 25, 2019.

(51) Int. Cl.
*G06Q 10/0833* (2023.01)
*B65G 1/137* (2006.01)
*G06K 19/077* (2006.01)

(52) U.S. Cl.
CPC ..... *B65G 1/1371* (2013.01); *G06K 19/07749* (2013.01); *B65G 2201/0258* (2013.01)

(58) Field of Classification Search
CPC .......... B65G 1/1371; B65G 2201/0258; G06K 19/07749; G06Q 10/0833
See application file for complete search history.

(56) References Cited

U.S. PATENT DOCUMENTS 5,729,697 A * 3/1998 Schkolnick .......... G06Q 20/208
235/383
6,997,382 B1 * 2/2006 Bhri ..................... G07G 1/0036
235/383

(Continued)

FOREIGN PATENT DOCUMENTS

EP        2534647         7/2020

OTHER PUBLICATIONS

International Search Report and Written Opinion dated Feb. 19, 2021 issued in corresponding IA No. PCT/US2020/062388 filed Nov. 25, 2020.

(Continued)

*Primary Examiner* — Patrick H Mackey

(57) ABSTRACT

In some embodiments, a mobile tote system includes a closeable mobile tote comprising an enclosure that includes a first radio-frequency-reflective surface and at least one radio-frequency-transparent layer. The system may include an engagement component that includes an RFID scanner having an RFID antenna. The engagement component may be configured to engage the mobile tote and to align the RFID scanner with the at least one radio-frequency-wave-transparent interface of the mobile tote to permit transmissions between the RFID antenna and the interior of the enclosure to pass through the radio-frequency-wave-transparent interface.

25 Claims, 7 Drawing Sheets

(56) References Cited

U.S. PATENT DOCUMENTS

| | | | |
|---|---|---|---|
| 7,225,980 B2 * | 6/2007 | Ku | G07F 7/02 |
| | | | 235/383 |
| 7,242,301 B2 | 7/2007 | August et al. | |
| 9,208,362 B1 * | 12/2015 | Fink | G06K 7/10336 |
| 9,449,266 B2 | 9/2016 | Emond | |
| 10,360,418 B2 | 7/2019 | Roth | |
| 10,402,600 B1 * | 9/2019 | Martin | G06K 7/10316 |
| 2006/0208072 A1 | 9/2006 | Ku et al. | |
| 2010/0213086 A1 | 8/2010 | Emond et al. | |
| 2016/0180124 A1 | 6/2016 | Roth | |
| 2018/0336383 A1 * | 11/2018 | Roth | G06K 7/10316 |
| 2019/0104652 A1 | 4/2019 | Elizondo, II | |

OTHER PUBLICATIONS

International Preliminary Report on Patentability dated May 17, 2022 issued in corresponding IA No. PCT/US2020/062388 filed Nov. 25, 2020.

* cited by examiner

RFID TOTE SYSTEMS AND METHODS

CROSS-REFERENCE TO RELATED APPLICATION

The present application is a 371 of International Application No. PCT/US2020/062388, which was published in English on Jun. 3, 2021, and claims the benefit of U.S. Provisional Patent Application No. 62/939,905 filed Nov. 25, 2019, both of which are incorporated herein by reference in their entireties.

BACKGROUND

There has been a worldwide ground swell movement of industries hoping to switch to more sustainable models of packaging. Both social pressures and a better sense of global stewardship of the environment are now primary policies in how business is conducted in many corporate organizations around the world. Retailers, especially food retailers, are embracing the sustainability initiative by eliminating plastic bags and encouraging shoppers to bring their own reusable doth bags when shopping. Some cities are even going as far as banning the use of plastic shopping bags, thereby making alternative packaging a critical need for many retailers, particularly food product retailers.

Additionally, shopping carts of all shapes and sizes have emerged in an effort to improve the consumer shopping experience. The traditional sales model is for the consumer to procure a fixed receptacle cart, essentially a basket on wheels, upon entrance to the store. The consumer pushes the cart up and down the store aisles, selects items from display shelves, and places the items in the cart. At checkout, each item is unloaded from the cart onto some form of conveyance or belt. Each item is then individually scanned by a laser scanner to tally the item's price, tender is offered, and all of the items are bagged and then placed back in the cart. The consumer then wheels the cart out to their car, removes the bags, and returns the cart to a collecting location. This step by step process of shopping and checkout may include inefficiencies or redundancies, but many retail store operations continue to operate this way.

Some stores reuse cardboard packing boxes and cartons as a means to handle the purchase and to help end customer carry and transport bulk items. Although this solution clearly reuses the cardboard at least once, there still remains a high degree of landfill disposal by the end customer instead of known dosed loop recycling processes. Wholesale dubs could actually recoup a financial benefit by implementing a full recycle method of this cardboard instead of simply using the boxes as glorified shopping bags. It is estimated that this type of recycling effort could translate into roughly $200 per ton of cardboard recoupable by store operators at today's prices. When multiplied by the number of retail stores for any given business, the amount recoupable becomes significant.

Therefore, there exists in the art a long felt need for a faster, more efficient, and/or less wasteful shopping solution.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The present disclosure discusses a mobile tote and related systems. In some embodiments, a mobile tote is configured for containing one or more radio-frequency identification (RFID) devices that are readable via an RFID reader when enclosed within the tote. For example, the RFID devices may be read when the mobile tote is positioned appropriately, such as on, in, or near a receptacle or other device. In some embodiments, a tote may be positioned for scanning (e.g., within an RFID scanning receptacle), and the RFID devices retained within, attached to, or otherwise associated with the tote are readable by the RFID reader. In various embodiments, the mobile tote may be engaged with, aligned with, or indexed into a receptacle or other structure. For some embodiments, the mobile tote together with the receptacle of the present disclosure may also be attachable to a transport unit for added mobility. Accordingly, the present specification makes specific reference thereto. However, it is to be appreciated that aspects of the present disclosure are also equally amenable to other like and/or related applications, devices and methods of manufacture.

In some embodiments, a mobile tote system includes a closeable mobile tote comprising an enclosure that includes a first radio-frequency-reflective surface and at least one radio-frequency-transparent layer. The system may include an engagement component that includes an RFID scanner having an RFID antenna. The engagement component may be configured to engage the mobile tote and to align the RFID scanner with the at least one radio-frequency-wave-transparent interface of the mobile tote to permit transmissions between the RFID antenna and the interior of the enclosure to pass through the radio-frequency-wave-transparent interface.

In various embodiments, the enclosure may include a base, a top, and a plurality of sidewalls extending between the base and the top to define an interior of the enclosure. The top and the plurality of sidewalls may include a radio frequency wave reflective layer. The top may include a radio frequency reflective layer, and the sidewalls may be composed of materials that are transparent to and that allow radio frequency transmission.

A portion of the sidewalls that are adjacent to the top also may include a radio frequency wave reflecting material. The radio frequency reflective layer may include a foil-based shrink wrap. The mobile tote may be manufactured from one of a recycled and recyclable material. A bottom of the mobile tote may be configured to permit passage of a radio frequency signal. The mobile tote may be dockable in the RFID scanning receptacle.

The mobile tote may include a plurality of contacts for connecting to the RFID scanning receptacle. The engagement component may include a socket base comprising an RFID antenna. The engagement component may include a socket basin. The enclosure may reflect a scanning signal emitted by an RFID antenna disposed in the socket base.

The socket base further may include a reflective surface portion. The engagement component may include a sidewall for retaining the mobile tote. The engagement component may include a plurality of feedback elements. The engagement component comp may include rises one or more tote interfaces for electrically coupling to a plurality of contacts of the mobile tote. The RFID scanning receptacle further may include a display screen. The system further may include a transport unit that has wheels and a frame configured to engage with the mobile tote.

The transport unit may be configured to engage a ground surface for transport of the mobile tote and is comprised of a charge terminal. An engagement component includes a socket for engaging with and accepting a mobile tote, an RFID antenna, and an externally mounted RFID reader interface configured to enable coupling of an RFID reader to the RFID antenna. The socket may include a socket base, wherein the RFID antenna is disposed in the socket base. The socket base further may include a reflective surface portion.

The socket may include a sidewall for retaining the mobile tote. The socket may include a plurality of feedback elements. The socket may include one or more tote interfaces for electrically coupling to a plurality of contacts of the mobile tote. The engagement component further may include a display screen. The socket may include a socket basin. Some embodiments of the present disclosure include a shopping tote that offers both a means of mobility and RFID reader functionality. Further, in some embodiments of the present disclosure, the shopping tote may be incorporated into a transport unit that can be charged/recharged in a charging corral and that may include systems for performing scan operations.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
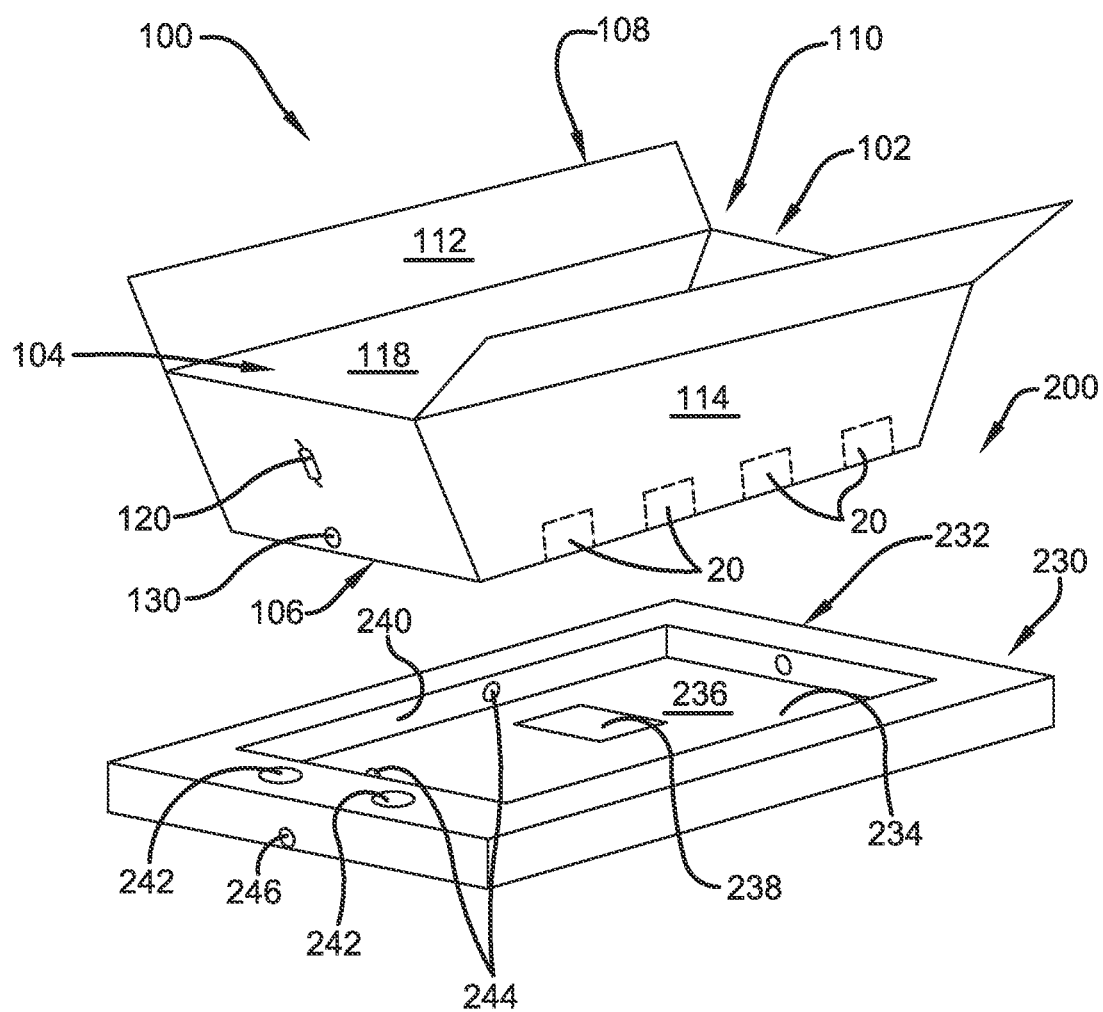
FIG. 1 illustrates a perspective view of a mobile read system comprising a mobile tote, and an RFID scanning receptacle in accordance with some embodiments.
Figure 2:
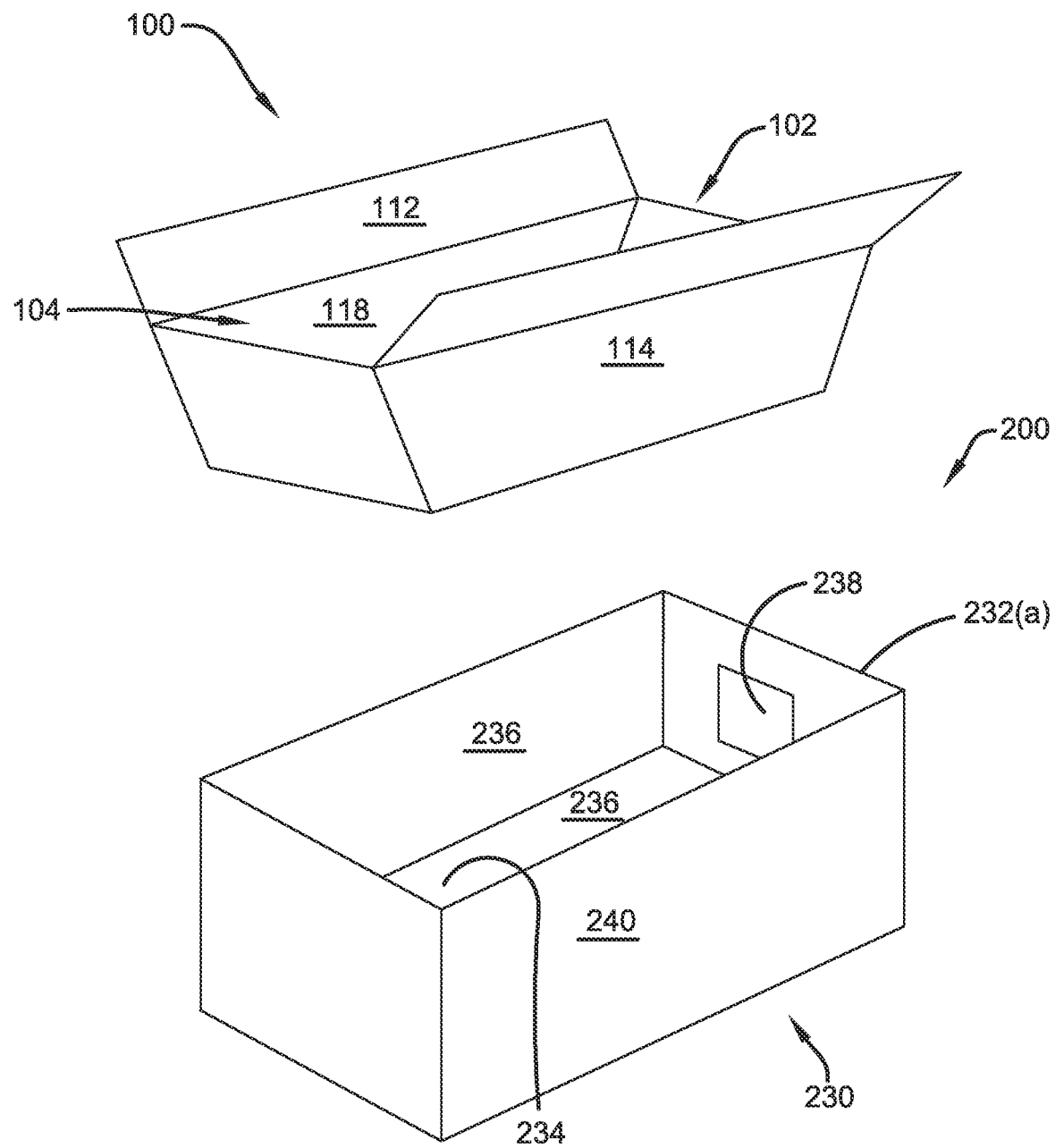
FIG. 2 illustrates a perspective view of a mobile read system comprising the mobile tote, and an RFID scanning receptacle in accordance with some embodiments.
Figure 3:
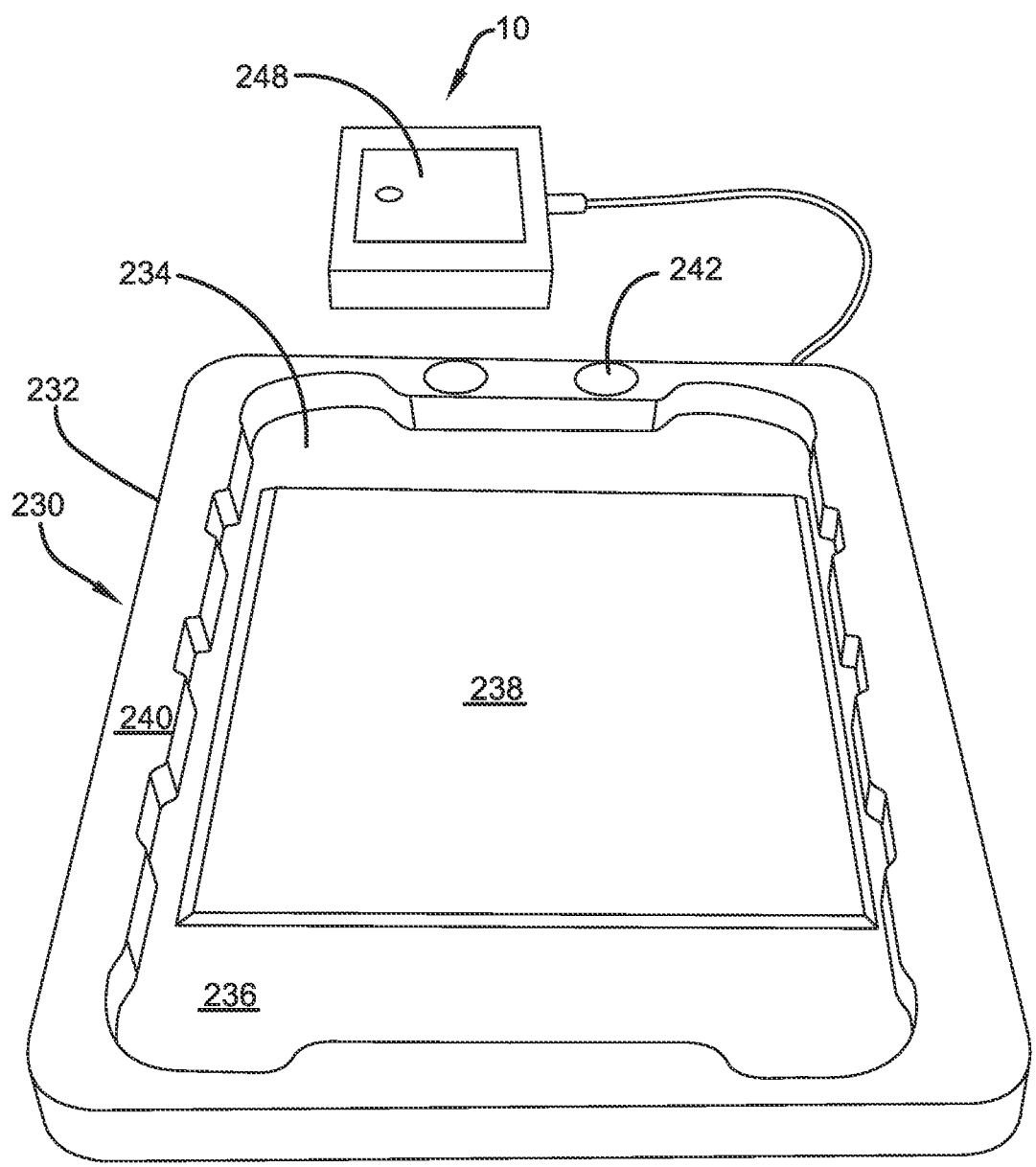
FIG. 3 illustrates a perspective view of the RFID scanning receptacle and an RFID reader in accordance with some embodiments.
Figure 4:
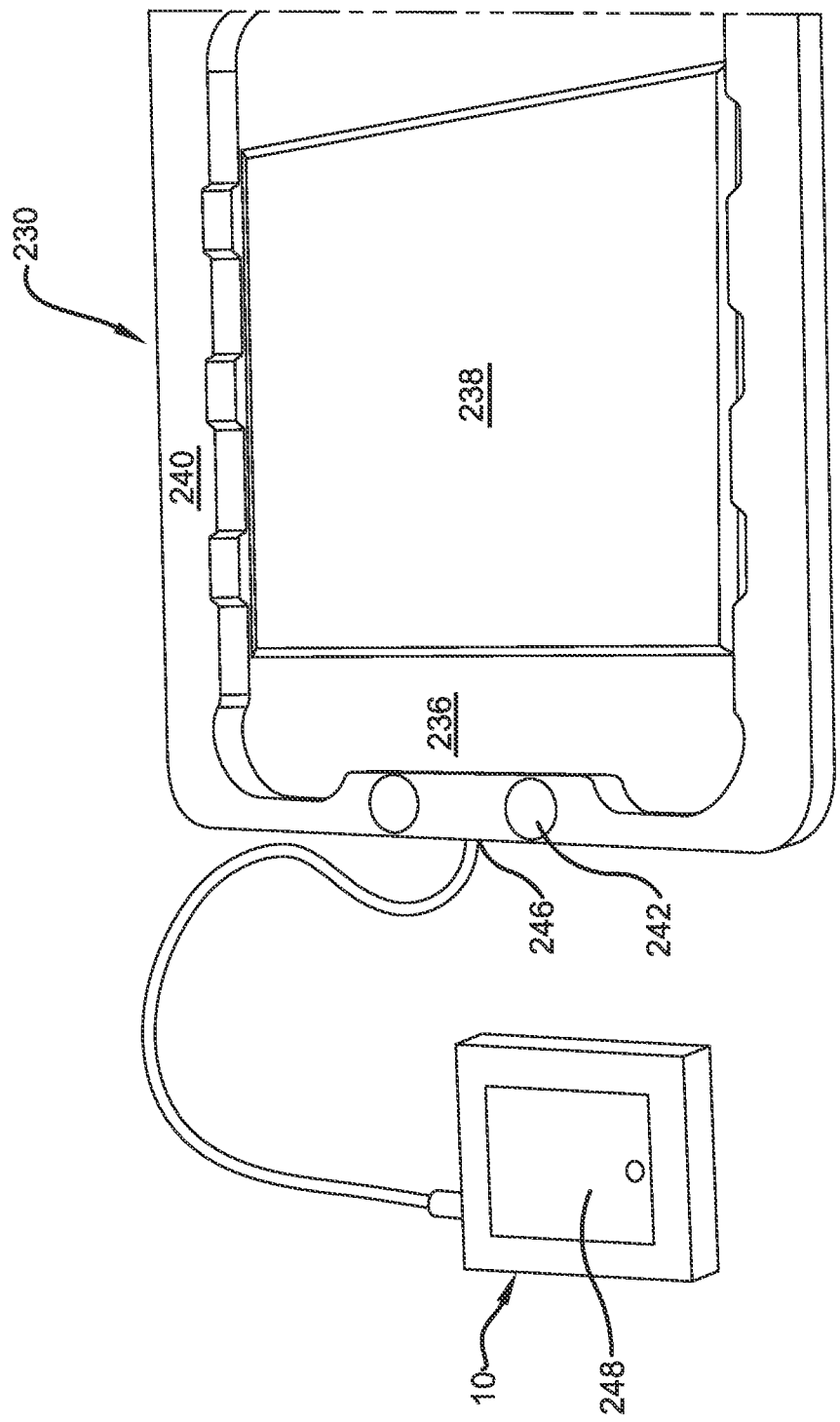
FIG. 4 illustrates a partial perspective view of the RFID scanning receptacle and the RFID reader in accordance with some embodiments.
Figure 5:
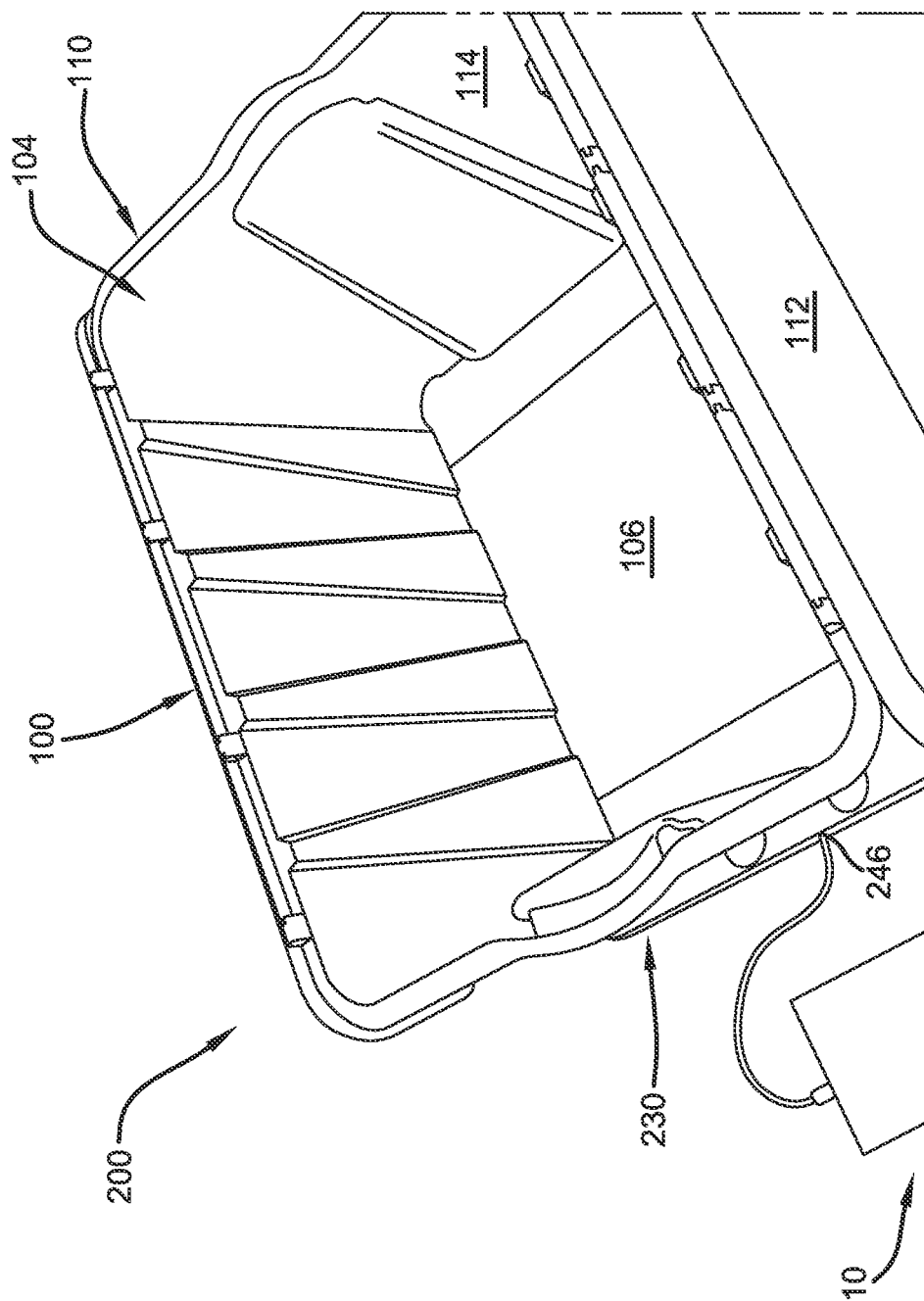
FIG. 5 illustrates a partial perspective view of a mobile high density read system comprising a mobile tote, an RFID scanning receptacle, and an RFID reader in accordance with some embodiments.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

In various embodiments, a shopping tote may include carrying capability and/or RFID reader functionality. The tote itself may be plastic or other materials in construction, but may include one or more unique features that aid and promote the effective use of RFID technology. The present disclosure may include a display screen and a microprocessor, or it may leverage the consumer's own smart device such as, but not limited to, a smart phone, a tablet, or a smart pad device. The present disclosure also leverages the investment in RFID labeling by allowing the tote to act both as a shopping bag with an automated checkout function, as well as a simple container for the various RFID tagged items. Further, it is contemplated that the shopping container could be a reusable plastic tote with an extremely long-life cycle. Alternatively, in some embodiments, the tote may be composed of recyclable materials so that it may be recycled itself once it reaches the end of its effective use, as even plastics will degrade over time due to wear and tear and/or damage. Therefore, various embodiments of the present disclosure fit within many sustainability models, as the tote may be one or both of reusable and recyclable.

More and more consumers are using personal shoppers to handle selection and delivery of grocery items. This personal shopping alternative also extends into retail markets other than grocery. There is also a large demand being placed on retailers for "same day" delivery. Accordingly, totes may be far more practical than bags to contain and consolidate items, and the personal shopper employee can benefit from the use of the tote of the present disclosure, therefore providing a labor savings for the retailer. The personal shopper also benefits from the use of totes for selection, and as a storage container for items and, when combined with a progressive checkout system, the desired items do not need to be handled more than once to complete a purchase of the items.

Another common problem plaguing the retail industry is the theft of retail items during their transportation and/or delivery. Totes have a further advantage of being sealable via something as simple as a zip tie, or more elaborate means, as a way of insuring product integrity. Some form of security tag may therefore be used to provide the end customer product integrity insurance. These security tags may be a simple as a label adherable across the seams of the tote lid. Alternatively, the security tag may be a label with an RFID inlay integrated into the label design whereby, when the seal is broken, the RFID inlay functionality is disrupted.

The tote of the present disclosure may enhance the customer experience in the aforementioned ways. For some embodiments, the tote does not include the use of plastic bags. In some embodiments, the tote does not include cardboard, which may need to be discarded. In various embodiments, the user can simply return the tote to the store for reuse or credit. Totes could also be purchased by the end consumer instead of the store credit methodology. Furthermore, ownership of the improved tote that has intrinsic financial value can lead to customer loyalty as the consumer has "skin in the game" leading to repeat business for the retailer.

In a credit system example, the retailer could follow a proven business model wherein the retailer supplies reusable cloth bags to customers. More specifically, the retailer could supply the totes of the present disclosure to customers in a similar manner. However, with broader uses, the totes may not always be returned to the retailer without an incentive for doing so, as the totes could easily be repurposed as a home storage bin or organizer. As the totes would have significant value to retail store operations, it is contemplated that a tangible shopper credit system could also be employed by the retailer to encourage shoppers to return and reuse the totes thereby encouraging repeat business and fostering customer loyalty.

Tote Construction

Referring initially to the drawings, FIG. 1 illustrates a mobile tote 100 according to some embodiments of the present disclosure. The mobile tote 100 comprises an enclosure 102 formed by one or more of a base 106, a top 108, and one or more sidewalls 114. In various embodiments, each of the plurality of sidewalls 114 extends between the base 106 and the top 108 to define an interior cavity 104. In some embodiments, mobile tote 100 may include a pair of sidewalls that are curved to form a pouch or bag. The side walls 114 may be joined at a bottom edge to form the bottom of the mobile tote 100. In some embodiments, a single curved side wall 114 may define a rounded outer surface of the mobile tote 100. In some embodiments, the side wall 114 may form a rounded bowl that thus also includes a bottom of the mobile tote 100.

In various embodiments, one or more of the base 106, the top 108, and one or more sidewalls 114 may be rigid or flexible and may have thicknesses ranging from 1 mm to 4 cm thick. In some embodiments, the thickness of the one or more of the base 106, the top 108, and one or more sidewalls 114 may be 1-2 mm, 2-4 mm, 4-6 mm, 7-8 mm, 8-10 mm, 10-20 mm, 20-30 mm, 30-40 mm, or greater.

In various embodiments, one or more of the base 106, the top 108, and one or more sidewalls 114 may be formed from one or more of plastic, wood, cardboard, paper, construction paper, wood, metal, fiberglass, and glass. In some embodiments, one or more of the base 106, the top 108, and one or more sidewalls 114 include a metal or other RFID reflective material that is intended to prevent RFID signals from escaping or entering the through the exterior of the mobile tote 100.

Reusability initiatives drive toward the elimination of single use disposable plastic bags, or even paper bags. As such, the tote itself can be repurposed via recycling. In some embodiments, the mobile tote 100 may be manufactured at least in part from a recycled or recyclable material, such as a heavy duty plastic. However, hardboard panels or waferboard could be used as well without impacting the RF signal requirements of the read tote 100. Additionally, a metal, such as a lightweight aluminum, could be used to form at least a portion of one or more of the top 108, the base 106, or the one or more sidewalls 114. In some embodiments, one or more portions of the base 106, the sidewalls 114, and the top 108 is manufactured from a material that allows the migration of an RF signal path into the interior cavity 104 of the mobile tote 100, such as a durable phenolic material, fiberglass, or heavy duty plastic.

In various embodiments, a plurality of RFID items 20 are readable via an RFID reader 10 when enclosed within the mobile tote 100. The mobile tote 100 may further comprise one or more RFID tote tags 120 located at an exterior, interior, or within the structure of the mobile tote 100. The one or more RFID tote tags 120 may be usable to provide a unique identifier for each mobile tote 100. For example, if a customer purchases a mobile tote 100, or uses one assigned to the customer, the unique identifier could be used as part of the checkout process in addition to other information that could be leveraged off of such an identifier.

The mobile tote 100 may further comprise an access 110. The access 110 may be positioned within one or more of the top 108, the one or more sidewalls 114, or the base 108, and is configured to enable a user (not shown) to access the interior 104 of the enclosure 102. One or more of the top 108, the one or more sidewalls 114, or the base 108 may further comprise a plurality of lid doors 112 that are openable to create the access 110, and closable to fully define the enclosure 102. One or more of the top 108, the one or more sidewalls 114, or the base 108 may be non-permanently sealable when the plurality of lid doors 112 are closed. As discussed previously, the security tag, label, tape, etc. may then be used to provide the end customer product integrity insurance that the contents of the read tote have not been tampered with.

The mobile tote 100 may also be used to support advertising or branding, and to encourage shopper loyalty. For example, a store logo, trademark, or name may be displayed on either the top 108, any of the plurality of sidewalls 114, or both. Further, shrink-wrap materials may also be used as a dynamic solution, whereby sale items could be displayed to encourage additional sales by the retailer.

In various embodiments, one or more portions of the interior and/or exterior surfaces or internal wall structures of the mobile tote 100 have an RF reflection capability, while one or more parts of the top 108, the one or more sidewalls 114, or the base 108 are configured to allow transmission of an RF signal into the interior of the mobile tote 100. As such, one or more parts of the top 108, the one or more sidewalls 114, or the base 108 may be lined with an RF reflective layer 118. In some embodiments, only the top 108, one of the sidewalls 114, or the base 108 includes a reflective layer or surface. In some embodiments, only a first wall comprising only the top 108, one of the sidewalls 114, or the base 108 includes a reflective layer or surface, and a part of the adjacent and/or connecting walls or surfaces also include a reflective layer or surface. In operation, such embodiments may cooperate with another enclosure, such as provided by an engagement component 262, to form a fully or partially closed area that prevents RF signals from escaping during a read operation.

The RF reflective layer 118 may be a foil based shrink-wrap, metal plate, deposited metal layer, or other suitable material. In some embodiments, one or more parts of the top 108, the one or more sidewalls 114, or the base 108 do not have such an RF reflective layer to permit the passage of an RF signal from an RF antenna into and/or out of the mobile tote 100 to complete the RFID read or scan.

A foil based shrink-wrap is a material that can provide the desired branding/advertising functionality, while also providing RF reflective capability. As the mobile tote 100 is useable in a high item density environment, one or more parts of the top 108, the one or more sidewalls 114, or the base 108 configured to allow an RF signal to be projected through them into the interior cavity 104 of the enclosure 102. More specifically, the RF signal will reflect or bounce all around within the confined space of the interior cavity 104 due to the RF reflective layer 118. This methodology has proven to be highly effective in high density read chamber solutions currently provided by Avery Dennison Corporation of Glendale, California. However, the present disclosure performs on a much smaller volumetric scale, and is also portable unlike the existing high density read chamber solutions. More specifically, the mobile tote 100 of the present disclosure is dockable with or in an RFID scanner 230 and is movable via a transport unit 360 as described more fully below.

The mobile tote 100 may also comprise one or more contacts 130 for connecting to an RFID scanning device or system, as best shown in FIG. 1.

Read System

FIGS. 1-5 illustrate an example of a mobile read system 200 (e.g., a high density read system) of the present disclosure. The mobile read system 200 comprises a mobile tote 100 and an RFID scanner 230. The mobile tote 100 comprises an enclosure 102 for containing a plurality of RFID tagged items 20. The enclosure 102 is formed a base 106, a top 108, and a plurality of sidewalls 114 extending between the base 106 and the top 108 to define an interior 104 of the enclosure 102 as described previously.

The mechanics of the functionality of the mobile tote 100 may include a means of initiating a read event. In various embodiments, the RFID scanner 230 (e.g., an RFID scanning receptacle) may comprise one or more of an engagement component 232. In various embodiments, the engagement component 232 may comprise one or more of a socket, a protrusion, a tab, a slot, a bracket, wall, floor, ceiling, or a frame that is configured to engage a corresponding part or parts of the mobile tote 100. The corresponding part or parts may include one or more parts of the top 108, the one or more sidewalls 114, or the base 108.

For example, in some embodiments, the engagement component 232 comprises a socket for accepting the mobile tote 100 and an RFID reader interface 246. The engagement component 232 may comprise an antenna platform 234 (e.g., a socket base), and the antenna platform 234 may comprise an RFID antenna 238 and/or reflective surface portion 236. In various embodiments, one or more of the engagement component 232, the antenna platform 234, the RFID antenna 238, and reflective surface portion 236 may contact at least a portion of or all of one or more of the base 106, the top 108, and one or more of the sidewalls 114 of the mobile tote 100.

The RFID antenna 238 may be configured to direct an RFID signal through the base 106 of the mobile tote 100 when it is docked with, coupled to, or adjacent to the antenna platform 234. The reflective surface portion 236 may cover a surface of the rest of the antenna platform 234 surrounding the RFID antenna 238. In various embodiments, the antenna platform 234 and/or the RFID antenna 238 may be disposed below, above, or to the side of the mobile tote 100. The antenna platform 234 and/or the RFID antenna 238 may form at least part of an inward facing base (see FIG. 1), sidewall (see FIG. 2), or may be disposed above the mobile tote 100. In various embodiments, the mobile tote 100 may be configured such that RF reflective or absorbing material (e.g., metal sheets, films, coatings, or walls) covers and/or forms the portions of the mobile tote 100 that are not covered by portions of the engagement component 232 when the mobile tote 100 and the engagement component 232 are engaged. In some embodiments, RF transparent materials (e.g., paper, plastic, wood) are used for at least part of the surfaces of the mobile tote 100 that are partially covered by parts of the engagement component 232, which may enable RF transmissions to travel from outside the mobile tote 100 into the mobile tote 100 without being reflected, and vice versa. For example, in FIG. 1, in some embodiments, RF transparent materials (e.g., plastic) may be used for 0-25%, 25-50%, 50-75%, or 75-100% of the portion of the sidewalls 114 that are covered by the side walls of the engagement portion 232. In some embodiments, metal is used to cover or form the portion of the sidewalls 114 that are not covered by the side walls of the engagement portion 232.

In various embodiments, the engagement component 232 further comprises a wall 240 for retaining the mobile tote 100, and the engagement component 232 (e.g., a socket, a protrusion, a scanner face) may act as a shallow or deep retaining receptacle for the mobile tote 100 to rest within. In some embodiments, the engagement component 232 may be configured to abut against or be inserted into a part of the mobile tote 100. In some embodiments where the engagement component 232 comprises a socket, the sidewalls may be 0-1 mm, 1-2 mm, 2-3 mm, 3-4 mm, 4-5 mm, 0-1 cm, 1-2 cm, 2-3 cm, 3-4 cm, 4-5 cm, 5-6 cm, 6-8 cm, 8-10 cm, or greater than 10 cm. In some embodiments, the engagement component 232 sidewalls may be ¼, ½, ¾, equal to, or greater in height than the walls of the mobile tote 100.

The engagement component 232, using the RFID antenna 238, may be configured to index the plurality of RFID tagged items 20. The engagement component 232 may further comprise one or more tote interfaces 244 for electrically coupling to one or more of contacts 130 of the mobile tote 100. The tote interfaces 244 may comprise switches, plugs, prongs, receptacles, surfaces, or electrical contacts. In various embodiments, all interior surfaces of the engagement component 232 may have a reflective coating or material, except over the RFID antenna 238 as previously indicated. The reflective coating or material may be configured to reflect, guide, or otherwise move the RF signal back into the interior 102 of the mobile tote 100 during a read event. In various embodiments, of the mobile tote 100 are reflecting the RF energy back into all of the contained plurality of RFID items 20 in what is now an RF sealed environment.

Additionally, the engagement component 232 may be configured to encourage consistent placement and/or retention of the mobile tote 100, such as in a mobile environment. In other embodiments, the mobile tote 100 may be placed on a flat, relatively smooth surface. Such placement may still allow systems to move, be misaligned, or improperly engaged, and the mobile tote 100 may be allowed in some circumstances to slide off the flat surface. However, such flat surface embodiments may have some benefits with respect to speed of access and simplicity of manufacturing.

The engagement component 232 may also encourage the mobile tote 100 to be indexed in a manner that allows for the integration of contacts, lights, or switches. For example, the engagement component 232 may comprise a socket into which the mobile tote 100 is inserted or a protrusion that is inserted into the mobile tote 100. In addition or alternatively, the engagement component 232 and the mobile tote 100 may each include one or more of a pair of mating parts that is intended to align and couple with a corresponding one of the pair of mating parts on the other of the engagement component 232 and the mobile tote 100. Such mating parts may include one or more of tabs, slots, teeth, openings, prongs, slots, or other mating surfaces or objects. For example, the engagement component 232 may include a tab, and the mobile tote 100 may include a slot configured to receive the tab, or vice versa. (See FIGS. 3-5).

For example, one or more of the walls of the engagement component 232 may have 1, 2, 3, 4, or more laterally extending protrusions that correspond to lateral indentations in one or more of the sidewalls 114 of the mobile tote 100. In some embodiments, one or more of the sidewalls 114 of the mobile tote 100 may include 1, 2, 3, 4, or more laterally extending protrusions that correspond to lateral indentations in the engagement component 232. The protrusions may fit within, conform to, and engage with the corresponding indentations.

The contacts 130 and tote interfaces 244 may be used to complete microcircuit interfaces between the mobile tote 100 and the RFID scanner 230. These microcircuits can provide triggering mechanisms that confirm or indicate when the top 108, or lid doors 112, are closed and when a read event may be initiated. Further, the mobile tote 100 may comprise circuits connected to the contacts that complete a loop that may be tied to the RFID reader 10 via the RFID reader interface 246 and/or to a general input/output interface (GPIO) of the RFID reader 10.

Additionally, the engagement component 232 may comprise one or more feedback elements 242, such as a microswitch, switch, button, contact, pressure sensor, capacitive sensor, photo sensor, or other sensor. More specifically, a microswitch may be placed in the engagement component 232 to register and/or communicate the presence of the docked mobile tote 100 within, next to, or in proximity with the RFID scanner 230. In various embodiments, the one or more feedback elements 242 may be used to confirm that the mobile transporter tote 100 is in position, has been docked with the engagement component 232, is physically near the engagement component 232, or has not yet been removed from the engagement component. This information may be useful for triggering functions such as turning lights on to illuminate the mobile transporter tote 100, or instructing the RFID reader 10 to power up and prepare to read the plurality of RFID tagged items 20 once the top 108 of the mobile tote 100 is closed and secured.

In some embodiments, one or more of the feedback elements 242 may be tactile (vibrate), visual, or audible feedback mechanisms useable to provide sensory cues as to the current operational status of the mobile read system 200. For example, one or more of the feedback elements 242 may light up, vibrate, or issue an alert tone or spoken instruction when one or more of the following occur: when the RFID reader has been turned on, when the mobile tote 100 is properly or improperly aligned and/or engaged with the engagement component 232, or when a read event has occurred.

In various embodiments, when using lights as at least one of the plurality of feedback elements 242, extremely low power, high lifecycle LED units are the most desirable due to the fact that movement, such as a sudden impact or jarring, would typically have little or no effect on these types of lighting units. Further, low power, high lifecycle LED units are also typically sealed so that exposure to moisture is not a concern, for example, in a grocery environment where there is a high predominance of liquids and moisture. The RFID scanner 230 may further comprise a display element 248, such as a display screen, for indicating the results of the RFID reader 10 and the read event such as: identification of the items detected via a successful read of the corresponding RFID tags, presentation of a purchase total, confirmation of a successful purchase, or notification regarding an unsuccessful purchase.

Basin

In some embodiments, the engagement component 232 of the RFID scanner 230 may be configured more as a container 232(a). In some embodiments of the present disclosure, the container 232(a) acts as a deeper retaining receptacle for a standard tote, such as a non-foil wrap non-modified tote, to rest within, and to index the plurality of RFID tagged items 20. In some embodiments, the basin itself provides the enclosure (i.e., encapsulation) as an alternative to the enclosure (i.e., encapsulation) provided by the foil wrap of the mobile tote construction. Additionally, an antenna platform 234 of the container 232(a) may be completely covered in a reflective surface portion 236. AN RFID antenna 238 is located along the wall 240 of the container 232(a) and is configured to direct an RFID signal through the sidewall 114 of the mobile tote 100 when it is docked within the container 232(a). The reflective surface portion 236 covers a surface of the rest of the wall 240 surrounding the RFID antenna 238.

In various embodiments, one or more of the walls 240 may cover one or more of the sides, top, and bottom of the container 232(a). The walls 240 may include one or more doors that may slide, rotate, or otherwise move to allow insertion of the mobile tote 100 into the container 232(a). For example, a bottom of the container 232(a) may be open to allow the container 232(a) to be lowered to cover the mobile tote 100 over an RF reflective surface. Once lowered, the container 232(a) may be closed, allowing the reader 10 to be activated to read the RFID tags within the mobile tote 100.

In some embodiments, one or more of the sides and/or top of the container 232(a) may be opened to allow either the container 232(a) and/or the mobile tote 100 to be moved into position to allow the RFID tags 20 contained within the mobile tote 100 to be read once the container 232(a) has been closed. For example, 1, 2, 3, or 4 sides and/or the top of the container 232(a) may be hinged to open and assemble the closed container 232(a) such that the mobile tote 100 is contained for a read event to occur.

Transport

Figure 6:
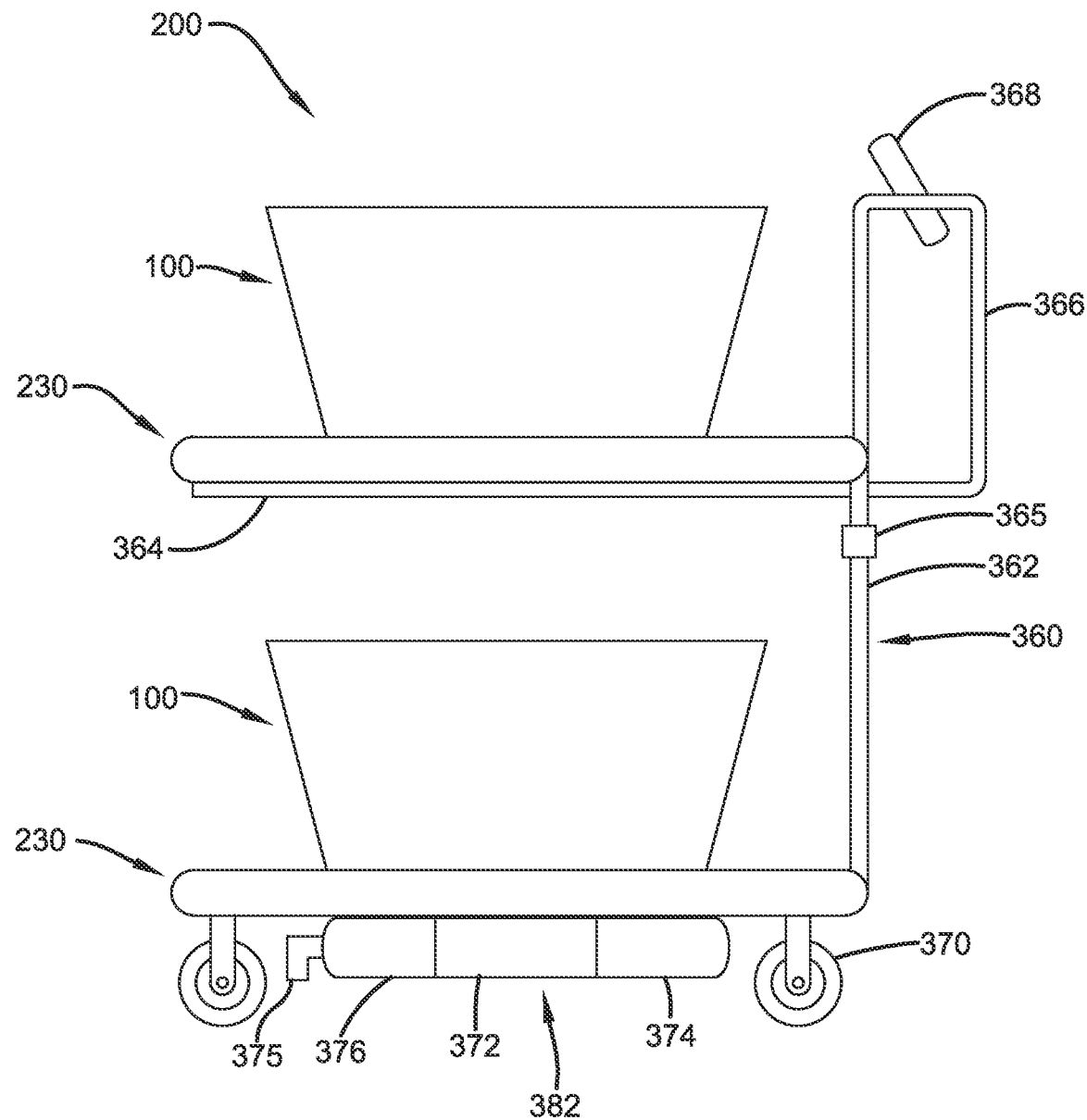
FIG. 6 illustrates a perspective view of a mobile high density read system comprising a mobile tote, an RFID scanning receptacle, and a transport unit in accordance with some embodiments.

In some embodiments, such as in FIG. 6, the mobile read system 200 includes one or more mobile totes 100, an RFID scanner 230, and/or a transport unit 360. The mobile tote 100 may include an enclosure 102 for containing a plurality of RFID tagged items 20. The enclosure 102 may include one or more of a base 106, a top 108, and/or one or more sidewalls 114, one or more of which may extend between the base 106 and the top 108 to define an interior 104 of the enclosure 102, such as described previously with respect to FIGS. 1-2.

As also previously disclosed, the RFID scanner 230 may include an engagement component 232 for accepting and retaining the mobile tote 100, and an RFID reader interface 246. The engagement component 232 may include an antenna platform 234, and the antenna platform 234 may include an RFID antenna 238 and/or a reflective surface portion 236. The RFID antenna 238 may be configured to direct an RFID signal through one or more portions of a base 106, a top 108, and/or one or more sidewalls 114 of the mobile tote 100 when it is docked with, abutted against, and/or coupled with the antenna platform 234. In some embodiments, the reflective surface portion 236 covers a surface of the rest of the antenna platform 234 surrounding the RFID antenna 238, and the enclosure 102 of the mobile tote 100 may be configured to reflect an RFID scanning signal emitted by the RFID antenna 238 of the RFID scanner 230, as previously disclosed.

For various embodiments, the mobile read system 200 can perform an instant checkout process. This may be accomplished using the RFID scanner 230 while placed on a countertop or while positioned on the transport unit 360 without the need to remove the mobile tote 100. These options provide flexibility to business operations as to how they wish to engage customers. In a customer centric operation, a formal checkout procedure may be employed that engages store employees to engage and assist customers. For some embodiments, the customer may be responsible for the individual selection and the checkout process is transparent to the customer as they exit the store. In this approach, the store operator need only focus on maintaining appropriate inventory levels for continuous product sale.

In some embodiments of the countertop approach, the mobile tote 100 may be removed from the transport unit 360 and placed in the RFID scanner 230 at a checkout location for an instant tally of items and a tabulation of the total sale. Of course, more than one of the mobile totes 100 could be scanned and accumulated before the final tally and completion of the financial transaction. However, in this example of the mobile read system 200, the RFID scanner 230 is mounted on the transport unit 360.

In various embodiments, the transport unit 360, such as a mobile carriage, comprises a frame 362 and a plurality of wheels 370 (e.g., 2, 3, 4, 5, 6 or other numbers of wheels), and is configured to engage a ground surface for transport of one or more mobile totes 100. The frame 362 may comprise shelving 364 (e.g., multi-tier shelving) for transporting one or more of the mobile totes 100. The transport unit 360 may further comprise one or more of the following: one or more inventory antennas 365 attached to frame 362, a handle 366, a consumer interface 368, and/or a processing unit 382. The processing unit 382 which is mountable to the frame 362 may further comprise one or more of an RFID reader 372, a central processing unit (CPU) 374, and a battery 376. Additionally, the transport unit 360 may further comprise a wireless communication capability, such as Wi-Fi, Bluetooth, cellular, etc., and/or a solar panel to power the processing unit 382 and/or charge the battery 376. Further, the consumer interface 368 may be or comprise a display having an integrated touch screen, such as a smart pad or tablet, or may employ the customer's own smart device with an application provided by the retailer.

Figure 7:
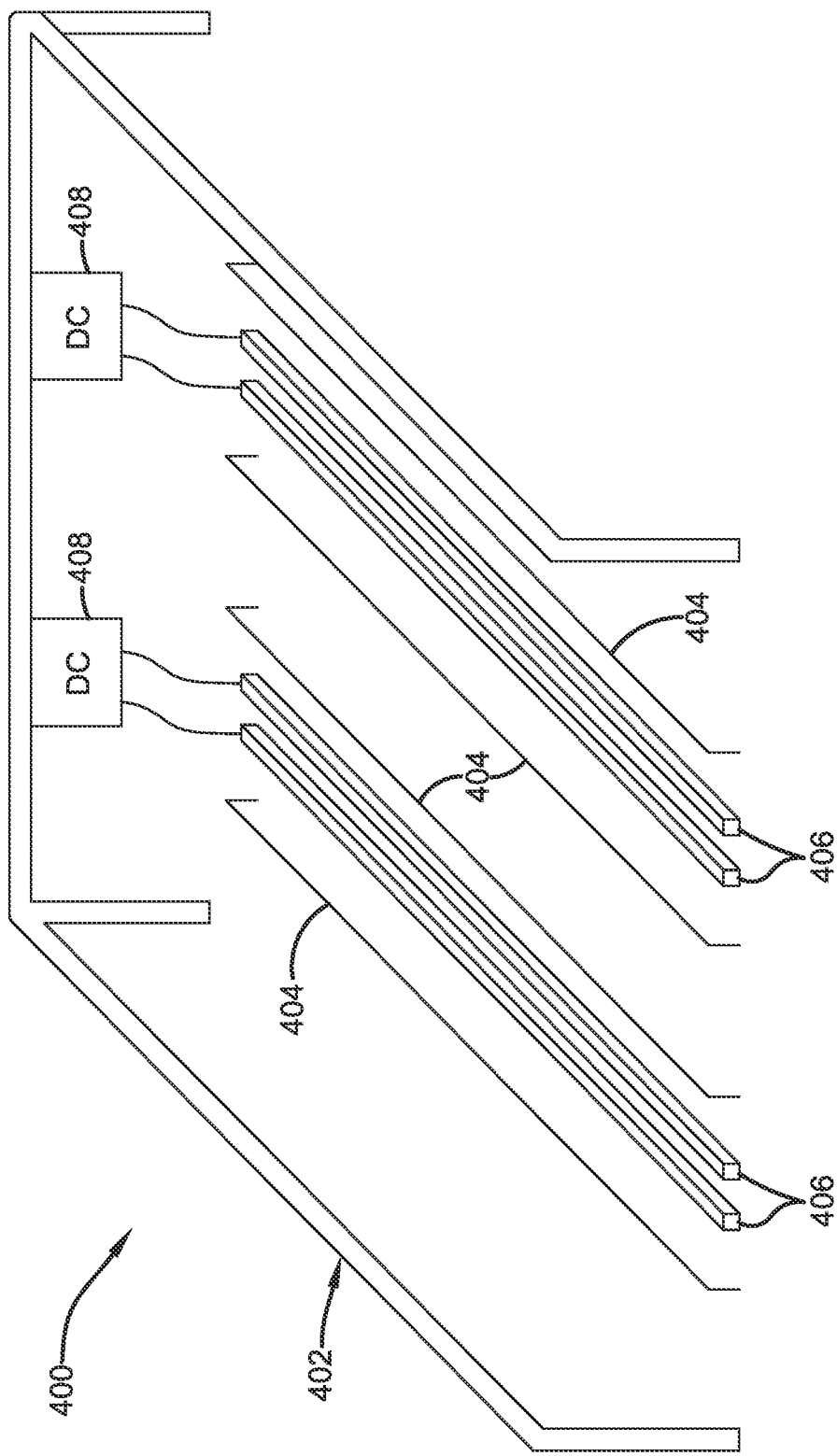
FIG. 7 illustrates a perspective view of a transport unit corral with charging station in accordance with some embodiments.

FIG. 7 illustrates a perspective view of a transport unit corral 400 with a charging station in accordance with some embodiments, and that may be located inside or outside of a retail location. In some embodiments, the corral 400 may be comprised of a frame or safety barrier 402 that at least partially surrounds and forms an outer barrier to corral 400, though a means of ingress/egress is provided to enable transport units 360 to enter and exit the corral 400. For example, one side of the corral may be open or openable. For example, the means of ingress/egress may include one or more of a moveable barrier, a curtain, door, panel, or other object used to allow entry or exit.

In some embodiments, corral 400 is further comprised of one or more pairs of spaced apart wheel guides 404, one or more pairs of spaced apart charging rails 406 and one or more chargers 408 that are in electrical communication with said charging rails 406. More specifically, the wheel guides 404 can be used to align the transport unit 360 within the corral 400. For example, the wheel guides 404 may be elongated walls extending between the means of ingress/egress and a rear wall of the corral 400. In some embodiments, the wheel guides 404 may be configured to hold one of the wheels 370 between two parallel and adjacent wheel guides 404 when a transport unit 360 is parked properly within the corral 400. In some embodiments, the wheel guides 404 are positioned such that the wheels 370 are disposed outside of the outermost pair of wheel guides 404 and/or inside the innermost pair of wheel guides 404 when the transport unit 360 is properly parked within the corral 400. For example, the front wheels of the transport unit 360 may be closer together than the rear wheels of the transport unit 360. Thus for some embodiments, when the transport unit 360 is properly parked within the corral, the front wheels may be disposed between the innermost wheel guides 404 while the rear wheels are disposed outside the outermost wheel guides 404.

In some embodiments, one or more charging rails 406 can be used to charge the transport unit 360 via one or more chargers 408 and one or more charge terminals 375 that may be positioned along transport unit 360, such as shown in FIG. 6. For example, a pair of charge terminals 375 may be configured to receive, respectively, a higher voltage and a lower voltage. The voltage difference may be 5V, 12V, 20V, or other standard voltages. At least one of the charge terminals 375 may extend downward from the transport unit 360 to an extent sufficient to contact one or more of the charging rails 406. For example, in some embodiments, a bottom or lateral surface of one or more charge terminals 375 may be configured by height and relative position relative to the wheels to contact a top or lateral surface of one or more of the corresponding charging rails 406 when the transport unit 360 is situated properly in the corral 400 due to constraints by one or more of the wheels 360 and one or more of the wheel guides 404.

In some embodiments, a first pair of adjacent and/or proximate charging rails 408 may receive the same first voltage value, (e.g., +5 V), and a first charge terminal 375 may be configured to contact one or both of the first pair of adjacent and/or proximate charging rails 408 to receive the first voltage value. For example, the first charge terminal 375 may extend between the first pair of adjacent and/or proximate charging rails 408 to improve a likelihood of achieving a good contact with at least one of the first pair of adjacent and/or proximate charging rails 408. A second pair of adjacent and/or proximate charging rails 408 may receive the same second voltage value (e.g., 0 V), and a second charge terminal 375 may be configured to contact one or both of the second pair of adjacent and/or proximate charging rails 408 to receive the second voltage value. For example, the second charge terminal 375 may extend between the second pair of adjacent and/or proximate charging rails 408 to improve a likelihood of achieving a good contact with at least one of the second pair of adjacent and/or proximate charging rails 408.

In some embodiments, a pair of adjacent and/or proximate charging rails 408 may receive a first voltage value, (e.g., +5 V) and a second voltage value (e.g., 0 V), and a pair of charge terminals 375 may be used to contact the pair of adjacent and/or proximate charging rails 408 to receive the first voltage value, (e.g., +5 V) and the second voltage value (e.g., 0 V). In some embodiments, two pairs of charging rails 408 may be configured such that a pair of charge terminals 375 may contact the first pair of charging rails 408 (e.g., a left side set of charging rails 408) when the transport unit 360 is disposed front first within the corral 400, and the same pair of charge terminals 375 contact the second pair of charging rails 408 (e.g., a right side set of charging rails 408) when the transport unit is disposed rear first within the corral 400.

In some embodiments, the transport units 360 may be charged by other methods, such as inductive coupling. More specifically, and as can be appreciated when observing such things as smart phones and motorized toothbrushes that incorporate a cordless recharging capability, the means of inductive coupling may be yet another means by which to recharge batteries in a non-contact manner. This alternate method may eliminate the need for charging rails 406, and some embodiments may replace one or more of the charging rails 406 with a wireless non-contact mechanism (not shown) to allow battery recharging.

The use of the mobile totes 100 may provide benefit by eliminating some redundancy in shopping operations. For example, in some embodiments, RFID tagged items may be picked from store shelves and placed in the mobile totes 100. The mobile totes 100 may then become both the transport container and the checkout mechanism, which may eliminate the need for the handling and removal of each item multiple times, as is needed with conventional checkout processes. RFID technology may further allow for the instantaneous tally and accounting of all items within the mobile totes 100 at any given moment in time. Future checkout using the present disclosure may use a customer relations member of the store staff positioned at the store exit handing the customer a receipt for the purchases, or at least a confirmation that the transaction was completed electronically.

Each of the mobile totes 100 may also incorporate one or more circuit paths and/or switches. For example, a fine gauge wire or a thin adhesive backed foil may be used to create circuit traces in key positions on the mobile tote 100. These circuit paths or traces can indicate whether the mobile tote 100 is in a condition to have the contents interrogated, such as if the top 108 of the mobile tote 100 is closed so that the RF signal will reflect appropriately within the enclosure 102. In various embodiments, a plurality of lid doors 112 in the top 108 being closed is configured to confine the RF signal within the enclosure 102, such as when the plurality of lid doors 112 have an RFID blocking reflective coating 118 and/or structural material. This RFID blocking reflective coating 118 may be intended to allow the RF signal to reflect within the enclosure 102 so that it is contained within the interior cavity 104 of the mobile tote 100 to improve the accuracy and completeness of the read event.

The contained RF signal within the mobile tote 100 may be key to allowing the RFID reader 372 to operate at much higher power emission levels without activating or influencing any RFID transponders located outside of the mobile tote 100 that are not intended to be read as part of the items selected for purchase. These higher power levels may be helpful due to both the potential of high density goods and the makeup of the product materials placed within the mobile tote 100 itself.

Factors, such as cans of items, containers of liquids, and the highly diversified mix of products found in stores all have a varying effect on how an RF signal will propagate. Metal cans of items not only reflect these signals, but may use specialized RFID inlays in order to function provide an RFID signal. Liquids are well known for their ability to attenuate or absorb RF signals at the frequency band that RFID operates within, and the diversity of packaging presents additional challenges as soft items may lie upon or conform to the contours of adjacent items. For example, a bag of sugar may wrap or press itself against the radius of a can. These challenges are why a very contained signal solution is required to be capable of properly performing read functions. The highly reflective technique for the RF signal in the present disclosure may allow the RF signal to approach RFID inlays from as many angles and paths as possible. This may be at least part of how a high density read chamber operates while still providing portability via one or more mobile totes 100.

Some embodiments include an additional and/or alternate use of the mobile read system 200 that involves a countertop approach. The RFID scanning receptacles 230 could be placed independent of the transport units 360, such as throughout a store. If the shopper does not have a smart device or the transport unit 360 did not have a consumer interface, the mobile tote 100 could be temporarily removed from the transport unit 360 and placed in one of the independently located RFID scanning receptacles 230. There the customer could self-perform item checks or perform a current tote item tally. The independent RFID scanning receptacles 230 could comprise readers, processors, and displays as previously described to make this possible.

The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile tote system comprising:
a closeable mobile tote comprising an enclosure comprising a first radio-frequency-reflective surface and at least one radio-frequency-transparent layer; and
an engagement component comprising an RFID scanner having an RFID antenna, the engagement component being configured to engage the mobile tote and to align the RFID scanner with the at least one radio-frequency-wave-transparent interface of the mobile tote to permit transmissions between the RFID antenna and the interior of the enclosure to pass through the radio-frequency-wave-transparent interface, wherein the engagement component comprises one or more tote interfaces for electrically coupling to a plurality of contacts of the mobile tote.

2. The system of claim 1, wherein the enclosure comprises a base, a top, and a plurality of sidewalls extending between the base and the top to define an interior of the enclosure.

3. The system claim 2, wherein the top and the plurality of sidewalls comprises a radio frequency wave reflective layer.

4. The system of claim 3, wherein the radio frequency reflective layer comprises a foil-based shrink wrap.

5. The system of claim 2, wherein the top comprises a radio frequency reflective layer, and the sidewalls are composed of materials that are transparent to and that allow radio frequency transmission.

6. The system of claim 2, wherein a portion of the sidewalls that are adjacent to the top also include a radio frequency wave reflecting material.

7. The system of claim 1, wherein the closeable mobile tote comprises a bottom configured to permit passage of a radio frequency signal.

8. The system of claim 1, wherein the mobile tote is dockable in an RFID scanning receptacle of the engagement component.

9. The system of claim 8, wherein the mobile tote comprises a plurality of contacts for connecting to the RFID scanning receptacle.

10. The system of claim 8, the RFID scanning receptacle further comprises a display screen.

11. The system of claim 1, wherein the engagement component comprises a socket base including an RFID antenna.

12. The system of claim 11, wherein the enclosure is configured to reflects a scanning signal emitted by an RFID antenna disposed in the socket base.

13. The system of claim 11, wherein the socket base further includes a reflective surface portion.

14. The system of claim 1, wherein the engagement component comprises a socket basin.

15. The system of claim 1, wherein the engagement component comprises a sidewall for retaining the mobile tote.

16. The system of claim 1, wherein the engagement component comprises a plurality of feedback elements.

17. The system of claim 1, further comprising a transport unit that has wheels and a frame configured to engage with the mobile tote.

18. The system of claim 17, wherein the transport unit is configured to engage a ground surface for transport of the mobile tote and is comprised of a charge terminal.

19. An engagement component comprising:
a socket for engaging with and accepting a mobile tote, wherein the socket comprises one or more tote interfaces for electrically coupling to a plurality of contacts of the mobile tote;
an RFID antenna; and
an externally mounted RFID reader interface configured to enable coupling of an RFID reader to the RFID antenna.

20. The engagement component of claim 19, wherein the socket comprises a socket base, wherein the RFID antenna is disposed in the socket base.

21. The engagement component of claim 20, wherein the socket base further comprises a reflective surface portion.

22. The engagement component of claim 19, wherein the socket comprises a sidewall for retaining the mobile tote.

23. The engagement component of claim 19, wherein the socket comprises a plurality of feedback elements.

24. The engagement component of claim 19, further comprising a display screen.

25. The engagement component of claim 19, wherein the socket comprises a socket basin.

* * * * *